US011816096B2

(12) United States Patent
Mansour et al.

(10) Patent No.: US 11,816,096 B2
(45) Date of Patent: Nov. 14, 2023

(54) SYSTEMS AND METHODS FOR MANAGING DESIGNATED CONTENT IN COLLABORATION SYSTEMS

(71) Applicant: Atlassian Pty Ltd., Sydney (AU)

(72) Inventors: Sherif Mansour, Peakhurst (AU);
Julien Michel Hoarau, Waterloo (AU);
Sylvain Guillope, Randwick (AU)

(73) Assignee: ATLASSIAN PTY LTD., Sydney (AU)

( * ) Notice: Subject to any disclaimer, the term of this patent is extended or adjusted under 35 U.S.C. 154(b) by 9 days.

(21) Appl. No.: 17/220,316

(22) Filed: Apr. 1, 2021

(65) Prior Publication Data

US 2021/0224255 A1  Jul. 22, 2021

Related U.S. Application Data

(63) Continuation of application No. 15/826,653, filed on Nov. 29, 2017, now Pat. No. 10,977,242.

(60) Provisional application No. 62/555,641, filed on Sep. 7, 2017.

(51) Int. Cl.
| | |
|---|---|
| *G06F 16/23* | (2019.01) |
| *H04L 51/04* | (2022.01) |
| *G06F 16/27* | (2019.01) |
| *G06F 16/951* | (2019.01) |
| *H04L 12/18* | (2006.01) |

(52) U.S. Cl.
CPC .......... *G06F 16/2379* (2019.01); *G06F 16/27* (2019.01); *G06F 16/951* (2019.01); *H04L 12/1822* (2013.01); *H04L 51/04* (2013.01)

(58) Field of Classification Search
CPC .................................................. G06F 16/2379
See application file for complete search history.

(56) References Cited

U.S. PATENT DOCUMENTS

| | | | |
|---|---|---|---|
| 8,892,524 B1 * | 11/2014 | Lee | G06Q 10/101 |
| | | | 707/665 |
| 9,413,708 B1 | 8/2016 | Michael et al. | |
| 2008/0091692 A1 | 4/2008 | Keith et al. | |
| 2008/0147470 A1 | 6/2008 | Johri et al. | |
| 2009/0006982 A1 * | 1/2009 | Curtis | G06Q 10/10 |
| | | | 715/753 |
| 2009/0049131 A1 * | 2/2009 | Lyle | H04L 51/04 |
| | | | 709/206 |
| 2009/0182763 A1 | 7/2009 | Hawking et al. | |
| 2009/0193345 A1 | 7/2009 | Wensley et al. | |
| 2009/0249228 A1 | 10/2009 | Cheng et al. | |
| 2010/0011292 A1 | 1/2010 | Marinkovich et al. | |
| 2010/0235763 A1 | 9/2010 | Massand | |
| 2011/0010182 A1 | 1/2011 | Turski et al. | |
| 2011/0022662 A1 | 1/2011 | Barber-Mingo et al. | |

(Continued)

*Primary Examiner* — Mohammad S Rostami
(74) *Attorney, Agent, or Firm* — Brownstein Hyatt Farber Schreck, LLP

(57) ABSTRACT

Described herein is a computer implemented method. The method comprises receiving a content item record in respect of a content item generated at a collaboration system and processing the received content item record to determine if the content item record includes any designated content. In response to determining that the received content item record includes designated content the method further comprises generating a designated content record in respect of the identified designated content and saving the designated content record to a data store.

20 Claims, 8 Drawing Sheets

(56) References Cited

U.S. PATENT DOCUMENTS

| | | |
|---|---|---|
| 2011/0296303 A1* | 12/2011 | Duquene ............... H04L 67/141 |
| | | 715/751 |
| 2012/0290943 A1 | 11/2012 | Toney |
| 2013/0046828 A1 | 2/2013 | Grewal et al. |
| 2013/0173531 A1* | 7/2013 | Rinearson ............... G06Q 30/02 |
| | | 707/608 |
| 2013/0191339 A1 | 7/2013 | Haden |
| 2014/0033009 A1 | 1/2014 | Rein |
| 2015/0163259 A1 | 6/2015 | Huang et al. |
| 2015/0177925 A1 | 6/2015 | Villaron |
| 2015/0205453 A1 | 7/2015 | Carlos et al. |
| 2015/0278750 A1 | 10/2015 | Bhagat et al. |
| 2015/0302886 A1 | 10/2015 | Brock et al. |
| 2016/0019018 A1* | 1/2016 | Xiong ................... G06F 3/1446 |
| | | 345/1.3 |
| 2016/0259508 A1* | 9/2016 | Eccleston ............. G06F 3/0484 |
| 2016/0277335 A1 | 9/2016 | Cheung et al. |
| 2016/0294759 A1 | 10/2016 | Huang et al. |
| 2016/0379117 A1 | 12/2016 | Faaborg et al. |
| 2017/0083871 A1* | 3/2017 | Chang .................... G06F 16/93 |
| 2017/0134316 A1* | 5/2017 | Cohen ................... H04L 51/216 |
| 2017/0193448 A1 | 7/2017 | Piyush et al. |
| 2017/0214722 A1 | 7/2017 | Bhattacharjee et al. |
| 2017/0228239 A1 | 8/2017 | Elassaad et al. |
| 2017/0257404 A1 | 9/2017 | Barber-Mingo et al. |
| 2017/0257405 A1 | 9/2017 | Lo et al. |
| 2017/0310614 A1 | 10/2017 | Lin et al. |
| 2018/0095709 A1 | 4/2018 | Nimri |
| 2018/0097902 A1* | 4/2018 | Meixner ................ G06F 3/0481 |
| 2018/0191645 A1 | 7/2018 | Cacioppo |
| 2018/0307383 A1 | 10/2018 | Faulkner et al. |
| 2018/0335935 A1 | 11/2018 | Larson |
| 2018/0336520 A1 | 11/2018 | Davis et al. |

\* cited by examiner

SYSTEMS AND METHODS FOR MANAGING DESIGNATED CONTENT IN COLLABORATION SYSTEMS

CROSS-REFERENCE TO RELATED APPLICATION(S)

This application is a continuation patent application of U.S. patent application Ser. No. 15/826,653, filed Nov. 29, 2017 and titled "Systems and Methods for Managing Designated Content in Collaboration Systems," which is a nonprovisional patent application of and claims the benefit of provisional application 62/555,641, filed Sep. 7, 2017 and titled Systems and Methods for Managing Designated Content in Collaboration Systems," the disclosure of which is hereby incorporated herein by reference in their entireties.

FIELD

Aspects of the present disclosure are directed to collaboration systems and to assigning designations to content items created thereon.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Many projects involve teams of people working together. Various collaboration tools are available to facilitate collaboration between team members. Very generally speaking, such collaboration tools allow users to generate content and publish that content so it can be seen/consumed by other users (e.g. other team members).

By way of example, chat or instant messaging services are one particular type of collaboration tool. Typical instant messaging programs allow rooms to be created and membership of those rooms to be defined. A member of a given room can generate and post content (e.g. a message) which is then displayed to all other members of the room.

While collaboration tools such as instant messaging programs can be very useful, the amount of content generated by users of collaboration tools can at times be overwhelming. The inundation of content in a collaboration tool can be exacerbated when both human users and programmatic clients are involved (e.g. programs that operate to automatically generate and post content on occurrence of a particular event or condition being met).

To illustrate the difficulty, consider a user who takes some time off in which they do not monitor the state of the collaboration tool. When that user returns there may be tens, hundreds, or even thousands of new content postings that the user has not seen (the exact number depending, of course, on how many collaborators are using the tool, how active the collaborators are, and how long the user in question has not been monitoring the tool for).

SUMMARY

The appended claims may serve as a summary of the invention.

DETAILED DESCRIPTION

Figure 1:
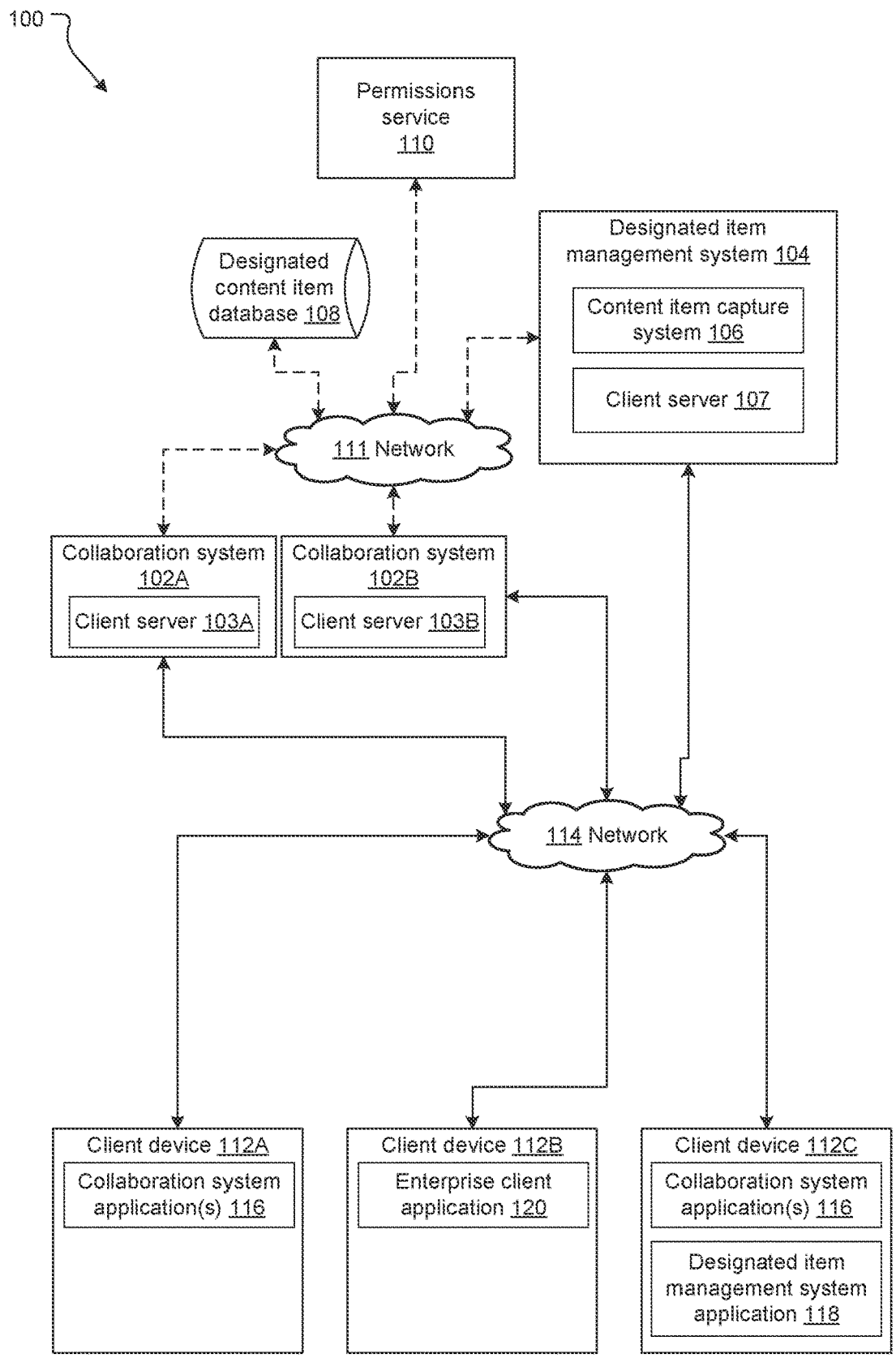
FIG. 1 is a block diagram of an exemplary architecture for the implementation of embodiments described herein.

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Overview

As discussed in the background, a variety of collaboration tools exist. Generally speaking, collaboration tools allow users to generate and share content with other users. Often this sharing is achieved by users posting content (e.g. comments or the like) which can then be viewed by and responded to other users.

One specific example of a collaboration tool is an instant messaging or chat tool, such as HipChat which is commercially available from Atlassian Pty Ltd. By way of broad overview, an instant messaging tool operates by providing instant messaging clients that run on users' computing devices. An instant messaging client operates to render one or more instant messaging interfaces on the user's device in which a user can generate and post content (which is seen by other uses) and view content posted by themselves and other users.

Another example of a collaboration tool is a wiki (such as Confluence which is commercially available from Atlassian) which allow users to generate, post and view content on web pages.

Another example of a collaboration tool is a ticketing or issue tracking system (such as Jira which is commercially available from Atlassian) which allow users to create tickets and generate/post/view content (e.g. comments) in respect of those tickets.

Another example of a collaboration tool is a source code or document management system (such as Bitbucket which is commercially available from Atlassian) which allow users to collaboratively work on source code or other content.

Another example of a collaboration tool is Trello.

Collaboration tools are often used in a variety of ways. For example, a given chat room in an instant messaging application may be used for a combination of work-related discussion and non-work-related discussion (e.g. social banter).

Furthermore, as discussions progress in collaboration tools (by one user posting a comment and one or more other users progressively responding) particular postings may be of greater importance and/or have more significant implications than other postings.

Consider, for example, the following hypothetical discussion involving a number of postings by various users:

TABLE A

Hypothetical discussion room discussion

| Post_id | User_id | Content |
|---|---|---|
| 001 | A | We should think about doing x |
| 002 | B | Why |
| 003-050 | A, B, C, D, E | [various users posting arguments for and against doing x] |
| 051 | B | When would we start? |
| 052 | C | Tomorrow? |
| 053 | | Agreed: so we will do x tomorrow. |

In this hypothetical discussion 53 posts are contributed by five users and the discussion culminates in a decision being made. In this case the final posting in which the decision is made may be considered to be more significant than the rest of the postings in that discussion. For example, the decision made may be of interest to a broader audience than the 5 users involved in the discussion. As a further example, anyone not involved in/active during the broader discussion may not be at all interested about the 52 posts leading up to the decision being made, but be very interested in the fact that a decision was made (and what that decision was).

Embodiments described herein operate to allow content items (e.g. messages posted to an instant messaging room, comments made on a wild page, comments attached to an issue of an issue tracking system) or parts thereof to be assigned particular designations. One such designation may a decision designation: i.e. that a particular content item or part thereof is a decision. Another such designation may an action designation: i.e. that a particular content item or part thereof is an action such as a task.

Once a content item or part thereof has been assigned a particular designation, various operations can be performed using that designation. These operations include, for example, operations to search for and surface content with particular designations in order to bring that content to users' attention, and operations by which designated content can be edited or modified (in some cases outside of the collaboration tool in which the content item was posted).

Allowing particular designations to be assigned to content and providing downstream operations based on those assignments provides a number of advantages.

For example, and referring to the example above, the most significant posting of a lengthy discussion may be a single content item (or a single part of a content item) in which a decision was made. In this case a user who remembers that a decision was made may not want to search back through the entire content history of a chat room to find the particular decision. By providing a mechanism for content to be designated as a decision and to allow users to search for decision content the user need not review all content items but can instead view only content that reflects decisions. Not only does this make it simpler for the end user, but it also improves processing and bandwidth overheads: instead of the user needing to obtain and review all content items posted to a room to find a particular decision only a subset of those items need to be accessed.

As an alternative example, a member of a chat room may not actively be involved in a particular discussion thread. Despite not being actively involved, a decision made in that discussion may be relevant to the user. In this case providing a mechanism by which the user can be alerted to the decision without having to read or monitor the entire discussion thread is also useful. The user may, of course, wish to view the entire discussion thread, but does not need to do so in order to find the decision (and may decide not to at all).

As a further example, a user may be inactive for a period of time (e.g. due to leave or other reasons). In this case when the user returns he or she may be faced with an overwhelming number of content items that were posted to various chat rooms they are a member of during their period of inactivity. Such a user may not be at all interested in reviewing the majority of content postings made during their inactivity but still want to be alerted to any important content items—e.g. decisions that were made, actions that were set. Embodiments described herein provide for such functionality.

The general principles of the present disclosure apply to any collaboration tool in which multiple users can collaborate by submitting/posting/publishing content for group review/consumption.

Initially a discussion of certain terms used in this specification will be provided. This is followed by a system architecture overview before describing the how content is assigned designations and various operations that can be performed in respect of designated content.

Terminology

As used herein, the term collaboration tool is intended to refer to a tool which allows users to share content with one another. As noted, examples of collaboration tools include: instant messaging tools (such as HipChat commercially available from Atlassian) which allow users to generate, post, and view content in chat rooms; wiki (such as Confluence commercially available from Atlassian) which allow users to generate, post and view content on web pages; ticketing or issue tracking systems (such as Jira commercially available from Atlassian) which allow users to create tickets and generate/post/view content (e.g. comments) in respect of those tickets; source code or document management systems (such as Bitbucket commercially available from Atlassian); other collaboration systems such as Trello. Collaboration tools are provided by collaboration systems which provide server side functionality and corresponding collaboration system clients which operate on client devices to provide client side functionality.

As used herein, the term content item is intended to refer to a single content item generated and posted by a user. For example, in the instant messaging scenario a content item may be a single message generated and posted by a user in a particular chat room. In the wiki scenario a content item may be a single comment posted by a user on a particular web page. In the issue tracking scenarios, a content item may be a single comment posted by a user in respect of a particular issue/ticket.

As used herein, the term content item part is intended to refer to a part of a content item. For example, if a content item includes multiple lines of text a part of the content item may be one or more words/lines of the entire text. Alternatively, if a content item includes text and/or objects/files, part of the content item may be a single file.

As used herein, the term designated content is intended to refer content of a content item that has been (and is currently) assigned one or more particular designations. By way of example, assignable designations may be that content is a decision, an action, and/or alternatively designated content.

As used herein, the term decision content is intended to refer to content of a content item that has been designated as a decision—i.e. content in which a decision has been made.

As used herein, the term action content is intended to refer to content of a content item that has been designated as an action—i.e. content in which an action (such as a task) has been set.

As used herein, the term non-designated content is intended to refer to content of a content item that has not been (or is not currently) assigned any particular designation.

As used herein, the term designated content item is intended to refer to a content item that includes designated content.

As used herein, the term non-designated content item is intended to refer to a content item that does not include any designated content.

As used herein, the term container is intended to refer to a container in which a content item is posted/published. For example, in an instant messaging collaboration system each chat room may be a separate container. In a wiki collaboration system, each space (e.g. group of webpages) may be a container. In an issue tracking collaboration system, each project may be a container. In a source code/document management collaboration system, each project may be a container. In a collaboration system such as Trello, each board may be a container.

As used herein, the term collaboration system record is intended to refer to a record in respect of a content item that is maintained by the collaboration system on which the content item was generated. For example, if a user generates and posts a content item (e.g. a message) in an instant messaging collaboration system the collaboration system record for that content item is maintained by the instant messaging collaboration system.

As used herein, the term designated content record is intended to refer to a record that is maintained by a designated content item management system. A designated content record will have a corresponding collaboration system record (though not all collaboration system records will have a corresponding designated content record). A designated content record may include some or all of the data from the corresponding collaboration system record for the content item, and/or may include additional data to the corresponding collaboration system record.

As used herein, the acronym DIMS refers to a designated content item management system: i.e. a system configured to manage and provide functionality with respect to designated content items.

Architecture Overview

Referring to FIG. 1, an example architecture 100 in which embodiments described herein may be implemented will be described.

Architecture 100 includes at least one collaboration system 102. In FIG. 1 two collaboration systems are depicted (102A and 102B). As discussed above, a collaboration system may, for example, be an instant messaging system, a wiki system, an issue tracking system, or an alternative collaboration system. Each collaboration system 102 includes at least a client server 103 which provides server side functionality for the collaboration tool offered by the collaboration system 102. A given client server 103 may be a web server (accessible by a web browser operating on a client device) or an application server (accessible by a dedicated application operating on a client device). A collaboration system may include multiple client servers 103.

Although not shown, a given collaboration system 102 may include further sub-systems working together to provide server side functionality—for example load balancers for managing client connections, database systems for storing/retrieving data, etc.

Architecture 100 also includes a designated content item management system 104. For convenience, the designated content item management system 104 will be referred to as the DIMS 104. Generally speaking, the DIMS 104 is configured to provide functionality in respect of content items created on a collaboration system 102 and that have content which has been assigned a designation. To provide this functionality, the DIMS 104 may also include a number of sub-systems. For example, in the illustrated embodiment the DIMS 104 includes a content item capture system 106 which operates to capture and process designated content items created on a collaboration system 102. The DIMS 104 also includes a client server 107 to provide server side functionality as described below. The DIMS client server 107 may be a web server (accessible by a web browser operating on a client device), an application server (accessible by a dedicated application operating on a client device). The DIMS 104 may include multiple client servers 107.

During its operation, the DIMS 104 is configured to generate designated content records and write these to a designated content item database 108. Designated content records correspond to collaboration system records in respect of content items that have been assigned a designation.

In certain embodiments, the DIMS 104 is configured also accesses a permissions service 110 in the course of performing operations with respect to designated content items.

In certain embodiments, the collaboration systems 102 and DIMS 104 may be offered/operated by the same entity. In this case communication between the collaboration systems 102 and DIMS 104 may be through a local network 111 (or other communications infrastructure). Communication between the DIMS 104, designated content item database 108, and permissions service 110 may also be through a local network 111.

In alternative embodiments, the DIMS 104 may be offered/operated by a different entity to the entity that offers/operates one or more collaboration systems 102. In this case communications between the DIMS 104 and any collaboration system 102 operated by a different entity maybe via a public network 114 such as the Internet.

In order to access a collaboration system 102 and the DIMS 104 an end user uses a client device 112. Three client devices are shown, 112A, 112B, 112C though in reality numerous client devices connect to the collaboration systems 102 and DIMS 104.

A client device 112 is configured to communicate with one or more collaboration systems 102 (or, specifically, client servers 103 thereof) and DIMS 104 (or, specifically, the client server 107 thereof) via network 114.

In some embodiments a client device 112 may connect directly to the DIMS 104. In other embodiments a client device 112 may access functionality provided by the DIMS 104 via a collaboration system 102: i.e. the client device 112 interacts with a collaboration system 102 which, in turn, connects to the DIMS 104 to provide DIMS functionality to the client device 112.

A given client device 112 stores and executes one or more client side applications that configure the device 112 to provide client side functionality for the one or more collaboration systems 102 and, in certain cases, the DIMS 102.

For example, client device 112 may run a dedicated collaboration system client application 116. When executed, a collaboration system client application 116 configures the client device 112 to access a collaboration system 102 and the various operations/functions provided thereby. In some embodiments a single collaboration system client application 116 provides client side functionality/access to all collaboration systems 102 that the client device (or user thereof) has access to. Alternatively, different collaboration system client applications 116 may provide access to different collaboration systems 102 that the client device 112 (or a user thereof) has access to (e.g. an instant messaging application for providing clients side instant messaging functionality, a wild application for providing clients side wild functionality, an issue tracking application for providing clients side issue tracking system functionality).

Access to the DIMS 104 (or client server 107 thereof) may be provided via a collaboration system client application 116 or via a dedicated DIMS client application 118 providing client side functionality for the DIMS 104.

In some cases, for example where all collaboration systems 102 and the DIMS 104 are operated by the same entity, a single enterprise client application 120 may be provided which configures a client device 112 to access both the relevant collaboration system(s) 102 and the DIMS 104.

In the description below reference is made to a client side application associated with a collaboration system 102. The client side application associated with a collaboration system 102 may be a dedicated client side application (i.e. that provides only access to the collaboration system) or may be an application that provides client side access to multiple collaboration systems and/or the DIMS 104. Similarly, reference to a client side application associated with the DIMS 104 may be a dedicated application that solely provides access to the DIMS 104, or may be an application that provides access to the DIMS 104 as well as one or more collaboration systems 102.

Collaboration System: Content Item Creation, Designation, and Modification

As discussed above, an end user may operate a client device 112 to interact with a collaboration system 102. As part of this interaction the end user may generate, post/submit, and modify content items. Creating or modifying a given content item may involve assigning one or more particular designations to content of the content item—e.g. designation of content as a decision, action, or other type of designation.

Figure 2:
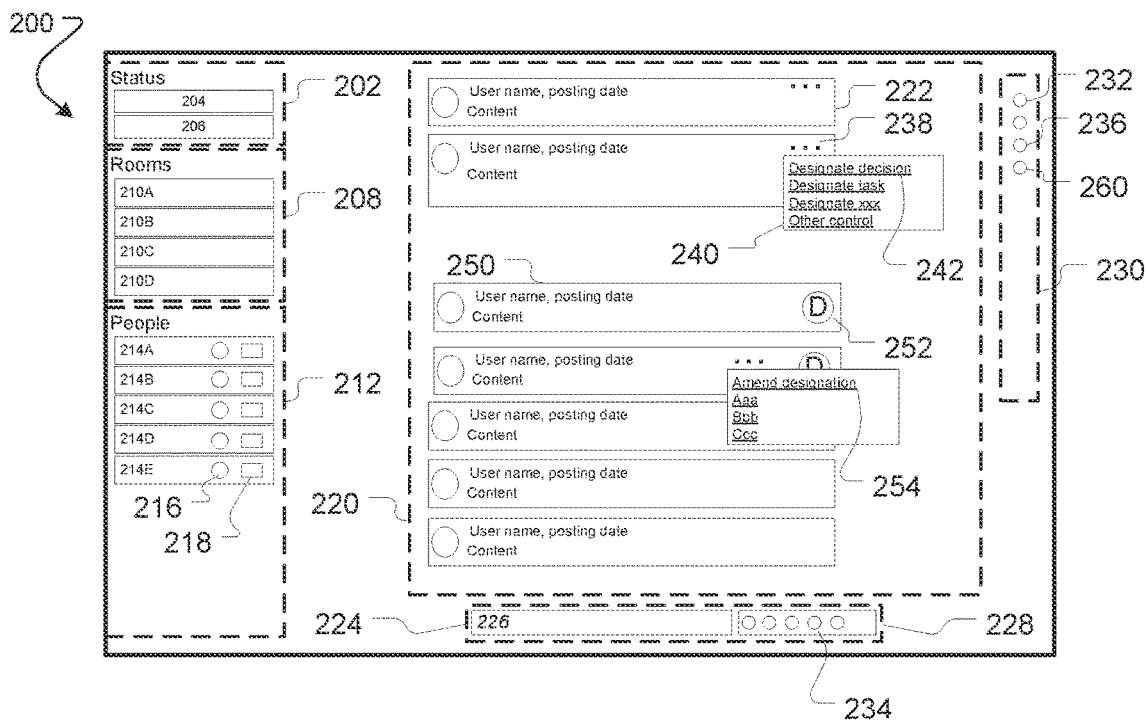
FIG. 2 is an example user interface for a collaboration system.

FIG. 2 is an example of a collaboration tool user interface—in this case an instant messaging user interface 200. User interface 200 is displayed on a display of a client device 112 by a collaboration system application 116.

User interface 200 is divided into various areas. These areas include, amongst others: a status area 202 showing the currents status of the user 204 (e.g. available) and the room 206 the user is currently viewing; an accessible rooms area 208 showing chat rooms 210 the user has access to; a participants area 212 showing users 214 (and, in some instance user avatars 216 and statuses 218 of those users) in the currently selected room; a content area 220 where content items 222 (e.g. messages) posted to the currently selected room are displayed; a content creation area 224 including a content entry box 226 in which a user can enter content and one or more content creation controls 228 operable by the user when creating content; and a general controls area 230 displaying various controls 232 operable by the user.

User interface 200 and the various areas/controls depicted are one example of user interface. User interfaces for different collaboration tools may include different user interfaces (with different user interface elements) depending on the functionality offered by the collaboration tool.

Content items may be created in various ways. For example, a user may type text (or drag objects such as images/files) into content entry box 226 and post the message (e.g. by activating a submit control, hitting an enter/return key or the like).

Once a content item has been submitted it is posted to the currently selected room and appears as a content item 222 in the content area.

The present disclosure provides various designation mechanisms by which a user may assign one or more particular designations to content of a content item.

One designation mechanism involves assigning a designation to content of a content item at the time it is created/posted. For example, in certain embodiments a designate content control 234 is provided as part of the user interface 200. In this example the designate content item control is provided in the content creation area 224. The designate content control 234 may be dedicated to a particular type of designation—e.g. a designate as decision control. Additional controls for alternative designations may also be provided—e.g. a designate as new action control. Alternatively, a designate content item control 234 may, on activation, cause additional controls to be displayed, each additional control being in respect of available designations (e.g. a designate as decision control, a designate as action item, other). Activation of a designate content control 234 allows a user to select part or all of the content that is to be assigned the selected designation. This designation is applied as metadata to the selected content on creation of the content item.

An alternative designation mechanism involves assigning a particular designation to part or all of the content of an existing (i.e. already created/posted) content item. For example, in certain embodiments an assign designation control 236 is provided as part of the user interface 200. In this example an assign designation control is provided in the general controls area 230. In order to assign a designation to content of an existing content item (e.g. designate content to be a decision) a user can select a particular content item 222 or part of the content thereof (e.g. by contacting or clicking on a particular content item 222 and/or selecting content therefrom) and then operate the assign designation control 236. The assign designation control 236 may be dedicated to a particular type of designation—e.g. a designate decision item control (and additional controls for alternative designations may also be provided). Alternatively, activation of the assign designation control 236 may cause further controls to be displayed, each further control being in respect of available designations (e.g. designate as decision content, designate as action content, designate as other content).

As a further example, an assign designation control may also (or alternatively) be accessible via the content item 222 itself. For example, in certain embodiments content items 222 may be rendered with a list controls element 238. On activation of the list controls element 238 (e.g. by clicking, contacting or otherwise selecting) various controls applicable to the content item 222 may be displayed (e.g. in a list 240). One such control may be an assign designation control 242. As with assign designation control 236, control 242 may be dedicated to a particular designation (e.g. a designate as decision content control) or may lead to a further set of options allowing the user to select a particular type of designation. When activated by a user, the assign designation control 242 allows selected content from the content item to be assigned the selected designation.

Other mechanisms/controls for either creating a new content item with designated content or editing an existing content item to assign/edit designated content (e.g. converting non-designated content to designated content) may be provided (instead of or in addition to those described).

Furthermore, certain designations may allow users to provide additional information relating specifically to the designation. For example, if content is designated to be action content, interface 200 may display controls by which a user can specify a due-date for the action or specific users who have been tasked with performing the action.

In certain embodiments, designated content (or content items that include designated content) may be visually distinguished from non-designated content. FIG. 2 provides an example of a content item 250 with content that has been designated as a decision item. Content item 250 includes an icon 252 which visually alerts users to the fact that item 250 includes a decision. Additional or alternative means may be used to visually distinguish designated content. For example designated content (or a content item including designated content) may be distinguished by one or more of: having a particular colour outline (e.g. green); having a particular background colour and/or pattern; having text of a particular colour, style, and/or font; having a particularly shaped bounding box; having a flashing appearance (e.g. alternating between one or more colours); or other means. Different designation types may also be visually distinguished from one another (and from non-designated content items). For example, a particular colour (e.g. green) may be used to indicate decision content, an alternative colour (e.g. red) used to indicate action content, and a further alternative colour (e.g. black) used to indicate non-designated content. In this way designated content can visually distinguished from one another and from non-designated content so as to be easily seen by a user scanning quickly though content.

Interface 200 may also provide one or more controls by which existing content items can be edited or amended. For example, content of a content item may be edited by adding/removing/amending text or other data associated with the item and/or adding/removing amending designations assigned to the content/parts thereof.

For example, the designation of designated content of a content item may be amended by: removing the designation (so the designated content becomes non-designated content) or changing the content to a new designation (e.g. changing decision content to action content). Further, designation information associated with designated content may also be edited (e.g. adding or amending a due-date associated with action content from date x to date y).

By way of example, in certain embodiments if designated content is selected, instead of displaying an assign designation control 236 and amend designated content control may be displayed. Similarly, for a designated content item the list of controls 240 displayed on activating the list controls element 238 may display an amend designated content control 254 (instead of an assign designation control 242). Activation of an amend designation control allows a user to delete or amend the designation assigned to content of the selected content item and/or edit designation information associated with the designated content.

Other mechanisms/controls for removing an assigned designation from content may be provided (instead of or in addition to those described). Furthermore, and as discussed below, in certain embodiments a user may view and interact with designated content items via the DIMS 104. For example, in certain embodiments a user may use the DIMS 104 to view and edit designated content items (or, at least, designated content of those items). In this case the DIMS 104 communicates with the collaboration system 102 at which the content item was originally created to update the collaboration system 102 with any edits.

Where designated content is converted to non-designated content any visual indicators used to distinguish that content as designated content are removed (so that the now non-designated content displays as a normal/non-designated content).

When a content item is generated and posted, a collaboration system record for that content item is created and saved to a collaboration system data store. Similarly, when an existing content item is edited the collaboration system record for that content item is updated. The collaboration system record for the content item may be created by the collaboration system client application 116 (running on a client device 112) and communicated to the relevant collaboration system 102. Alternatively, the collaboration system client application 116 may communicate data in respect of the content item to the collaboration system 102 and the collaboration system 102 itself may generate the collaboration system record for that content item.

By way of example, a collaboration system record created by an instant messaging collaboration system in respect of a content item may include the following fields:

TABLE B

Example collaboration system record

| Field | Description |
|---|---|
| record_id | Unique identifier of the collaboration system record. |
| created_at | Timestamp of date/time content item was posted. |
| updated_at | Timestamp of date/time content item was updated. |
| status | Status information in respect of a content item. E.g.: (created, archived, deleted). |
| creator | Unique identifier of user posting content item. |
| body | The actual content or body of the content item (e.g. text, files etc) or a link thereto. The content/body of a content item may metadata indicating that part (or all) of the content item has been assigned one or more designations. |
| container | An identifier of the container (e.g. a chat room for an instant messaging collaboration system) in which the content item was posted. |

A given collaboration system 102 may generate and store collaboration system records with additional, fewer, or alternative fields to those shown in the example above.

Designated content may be indicated/stored in various ways. By way of example, content may be stored as nodes and designated content specifically indicated as such. For example, a decision content may be recorded as follows:

TABLE C

Example decision content node

```
{
 "type": "decisionItem",
 "attrs": {
   "localId": "item-test-id",
   "state": "DECIDED"
 },
 "content": [
   {
     "type": "text",
     "text": "Heading"
   }
 ]
}
```

Alternative means for recording designated content may also be used. For example, a mark-up approach may be taken where designations are indicated by appropriate tags—e.g. <decision> . . . </decision> for decision content, <task> . . . </task> for task content etc.

The example above is provided in the context of an instant messaging collaboration system 102 (and corresponding client application 116/user interface 200). The features described—e.g. assigning particular designations to content items—can be applied to other collaboration tools. Generally speaking, such features can be applied to any collaboration tool in which users can post content or comments—e.g. in wiki applications, issue tracking applications, etc.

Creating a New Content Item

This section describes operations performed by a collaboration system 102 and by the DIMS 104 when the collaboration system 102 is used to create a new content item.

Collaboration System Operations

Figure 3:
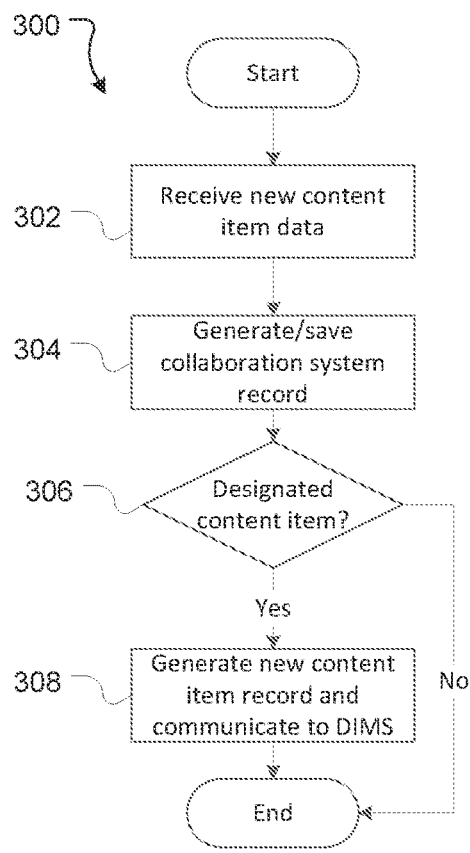
FIG. 3 is a flowchart showing operations performed by a collaboration system on creation of a new content item.

Operations performed by the collaboration system 102 on creation of a new content item will be described with reference to process 300 of FIG. 3.

At 302, the collaboration system 102 receives new content item data from its client application 116. The new content item data is in respect of a new content item.

At 304, the collaboration system 102 generates a collaboration system record in respect of the new content item and saves this to a collaboration system database.

At 306, the collaboration system 102 determines whether or not the new content item is a designated content item (for example if the new content item has been created with decision content, action content, and/or alternatively designated content).

If, at 306, the new content item is determined not to be a designated content item, process 300 ends.

If, at 306, the new content item is determined to be a designated content item, process 300 continues to 308. At 308, the collaboration system 102 generates a new content item record and communicates that new content item record to the DIMS 104. The new content item record includes relevant data in respect of the new content item and may (but need not) be the same as the collaboration system record created for the new content item. Process 300 then ends.

DIMS Operations

Figure 4A:
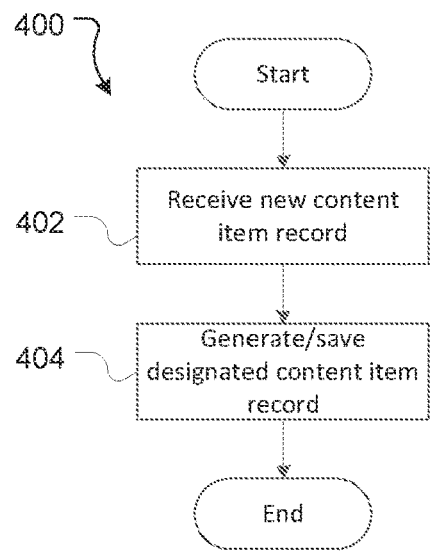
FIGS. 4A and 4B are flowchart showing operations performed by a designated item management system on receiving a new content item.

Operations performed by the DIMS 104 (and in particular the content item capture system 106) on creation of a new content item will be described with reference to process 400 of FIG. 4.

At 402 the DIMS 104 receives a new content item record from a collaboration system 102.

During operation the DIMS 104 will receive many content items, either in real time or batch mode, and potentially from different collaboration systems. To handle incoming content items the DIMS 104 may maintain a queue or buffer of received content item records which are processed in turn, for example on a FIFO basis.

At 404 the DIMS 104 generates a designated content record for the content item and at 406 saves this record to the designated content item database 108.

The designated content record for a given content item may include various data. In certain embodiments, a designated content record includes the following fields:

TABLE D

Example designated content record

| Field | Description |
| --- | --- |
| DIMS_record_id | Unique identifier of the designated content record. |
| collaboration_system_record_id | The collaboration system's unique identifier for the content item. |
| record_id | Unique identifier of the collaboration system record corresponding to the DIMS record. |
| created_at | Timestamp of date/time content item was posted. |
| updated_at | Timestamp of date/time content item was updated. |
| action_state | State information where a designated action item. E.g.: (to do, completed) If content item is not an action item may be blank. |
| Status | Status information in respect of a content item. E.g.: (created, archived, deleted). |
| creator | Unique identifier of user posting content item. |
| body | The actual content posted (e.g. text, files etc) or a link thereto. |
| container | identifier of the container (e.g. chat room) in which the content item was posted. |
| participants | User identifiers (e.g. in an array) of users mentioned in the content item. |
| due_date | If a designated action item, timestamp of date that action is due. If content item is not an action item may be blank. |

In the example above the entire body of the original content item is included in the designated content record. In alternative embodiments, only the actual designated content of a content item is included in the designated content record. For example, a content item may be a web page of the entire minutes from a meeting, but only one sentence has been designated as a decision. In this case instead of storing the entire content item (web page) only the designated content (the single sentence) is stored. Furthermore, a single content item may have multiple pieces of designated content (potentially of different designations). For example, the minutes content item may include several decisions and several tasks. In this case a designated content record may be created for each decision and each task.

Figure 4B:
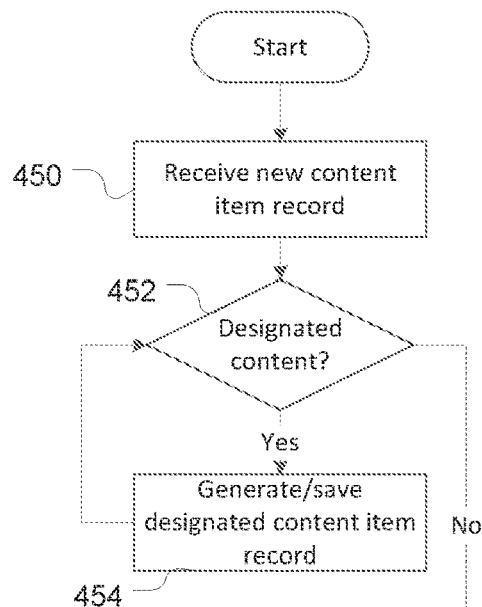

In this case a process along the lines shown in FIG. 4B occurs. At 450 a new content item record is received.

At 452, the new record is processed to identify designated content. If no designated content is identified the process ends.

If, at 452, designated content is identified, the process continues to 454. At 454 the identified designated content is extracted and a designated content record is created in respect of the extracted designated content. The process then returns to 452 to determine if the content item record includes any further designated content.

Editing Existing Content Items Using a Collaboration System 102

This section describes operations performed by a collaboration system 102 and by the DIMS 104 when the collaboration system 102 is used to edit an existing content item.

Collaboration System Operations

Figure 5:
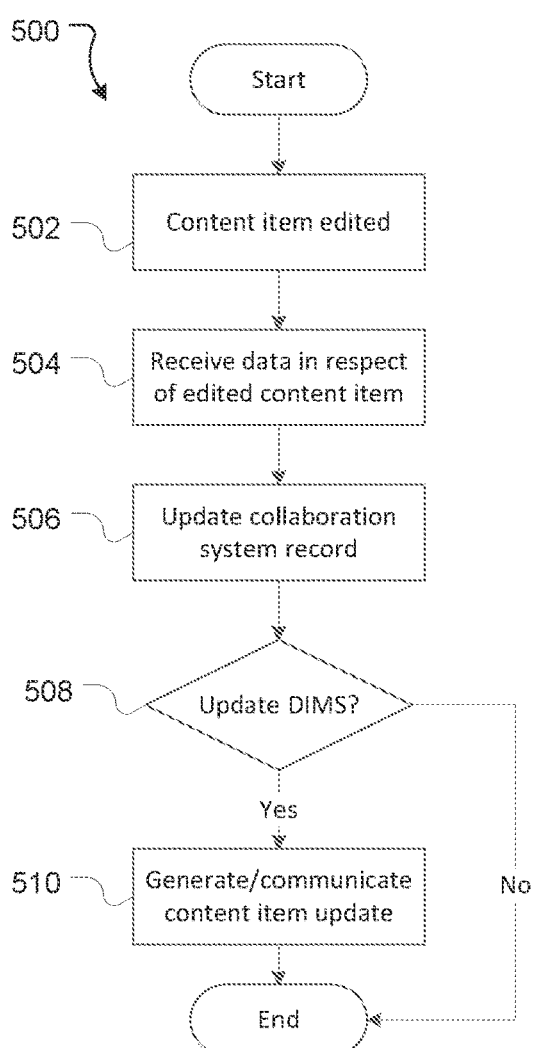
FIG. 5 is a flowchart showing operations performed by a collaboration system on an existing content item being edited through the collaboration system.

Operations performed by the collaboration system 102 (and its associated client application 116) when an existing content item is edited will be described with reference to process 500 of FIG. 5.

At 502, an existing content item is selected by a user and edited. This selection is performed by a user interacting with client device 112 (and the collaboration system application 116 running thereon). The collaboration system application 116 may provide various interface options for selecting and editing an existing content item. For example, and as described above, a content area 220 in which content items are displayed may be navigated by the user until the content item of interest is displayed, and then selected by the user (e.g. by clicking, contacting or otherwise selecting) for editing. Alternatively, the collaboration system application 116 may provide mechanisms by which a user can search for particular content items, and any content item resulting from a search may then be selected and edited. An example of such a search is searching for designated content items as discussed below.

At 504, the collaboration system 102 receives user edits to the content item selected and edited at 502. Edits are received from the collaboration system application 116 operating on client device 112.

At 506, the collaboration system updates 102 the collaboration system record for the content item to account for the edits.

At 508, the collaboration system 102 determines whether the edits made in respect of the content item require the DIMS 104 to be updated. If an edit is in respect of a designated content item, or converts a non-designated content item to a designated content item, the collaboration system 102 determines that the DIMS 104 does need to be updated and the process continues to 510. If not (for example if a non-designated content item is edited but not converted into a designated content item) the collaboration system 102 determines that the DIMS 104 does not need to be updated and the process ends.

At 510, on determining that the DIMS 104 does need to be updated, the collaboration system 102 generates a content item update and at 512 communicates this update to the DIMS 104. The content item update includes at least a content item identifier and relevant information in respect of the edits made.

After communicating the content item update to the DIMS 102, process 500 ends.

DIMS Operations

Figure 6:
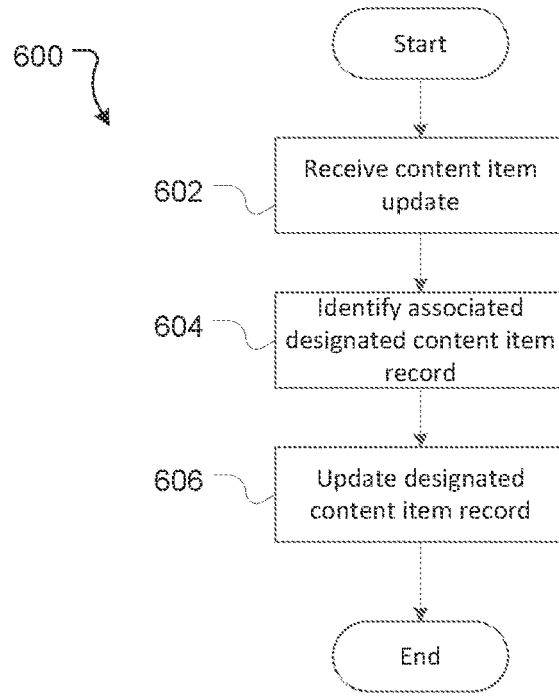
FIG. 6 is a flowchart showing operations performed by a designated item management system on receiving a content item update indicating a content item has been updated through a collaboration system.

Operations performed by the DIMS 104 on receiving a content item update will be described with reference to process 600 of FIG. 6.

At 602, the DIMS 102 receives a content item update from a collaboration system 102.

At 604, the DIMS 102 identifies the designated content record(s) to which the content item update relates. This identification may be made, for example, by reference to a content item identifier received with/in the content item update.

At 606, the DIMS 102 updates the designated content record(s) to account for the edits notified in the content item update received at 602. Process 600 then ends.

Editing Existing Designated Content Using the DIMS

In certain embodiments edits to designated content items (or, designated content therefrom) may be made using the DIMS 102 (and associated client application 118) directly rather than via the collaboration tool 102 on which the content item was originally created.

DIMS Operations

Figure 7:
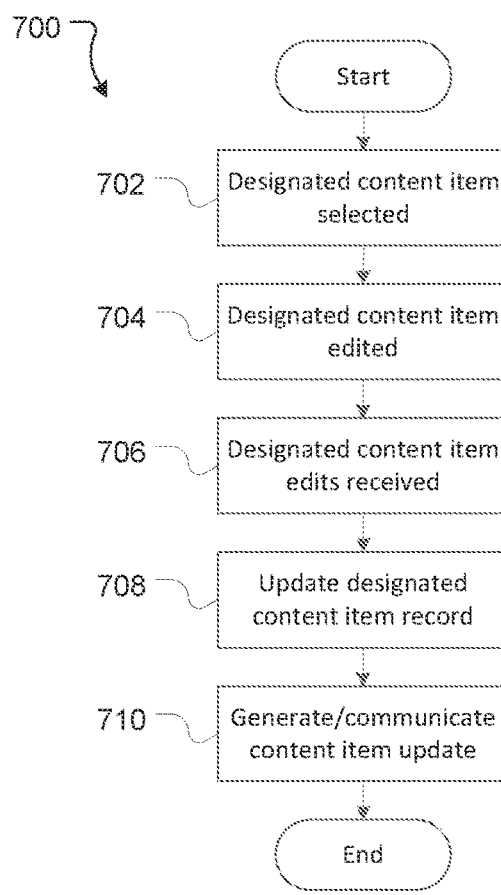
FIG. 7 is a flowchart showing operations performed by a designated item management system on an existing content item being edited through the designated item management system.

Operations performed by the DIMS 104 (and client application 118) to edit an existing designated content item (or designated content therefrom) will be described with reference to process 700 of FIG. 7.

At 702, an existing designated content item record is selected by a user. This selection is made by use of the DIMS client application 118 running on client device 112. As described below, one way in which an existing designated content item record may be selected is by performing a search for designated content items and selecting one of the search results.

At 704, the selected designated content item record is edited by the user. Edits are made via the DIMS client application 118, which may provide various user interface tools to facilitate editing a content item. Edits to a designated content item record may include, for example, one or more of: changing the designation of the content (e.g. from decision content to action content); removing the content designation to convert it to non-designated content; editing designation information associated with the designation; amending the actual content.

At 706, the edits made to the selected content item record are received by the DIMS 104 (e.g. by the DIMS client server 107).

At 708, the DIMS 104 updates the selected designated content record to account for the edits. If the edits involved converting the selected content item from designated content to non-designated content, updating the designated content record may involve deleting the designated content record.

At 710, the DIMS 104 generates a content item update and communicates the content item update to the relevant collaboration system 102 (i.e. the collaboration system 102 on which the selected content item was originally created). The content item update includes at least an identifier of the content item and information in respect of the changes that have been made. Process 700 then ends.

Collaboration System Operation

Figure 8:
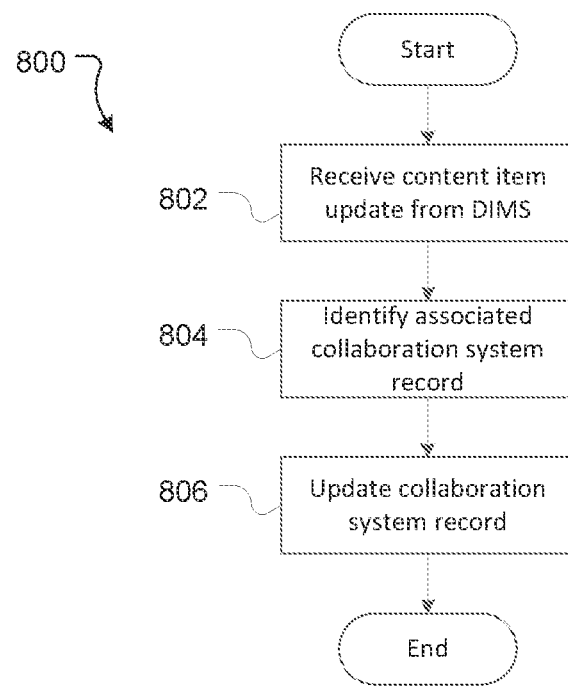
FIG. 8 is a flowchart showing operations performed by a collaboration system on receiving a content item update indicating a content item has been edited through a designated item management system.

Operations performed by the collaboration system 102 on receiving a content item update from the DIMS 104 will be described with reference to process 800 of FIG. 8.

At 802, the collaboration system 102 receives a content item update from the DIMS 104.

At 804, the collaboration system 102 identifies the collaboration system record corresponding to the received update.

At 806, the collaboration system 102 updates the collaboration system record to account for the edits communicated in the received update.

Searching for Designated Content Via a Collaboration System

In certain embodiments a collaboration system 102 (working in conjunction with its client application 116) facilitates searching for designated content (or items containing designated content) by the collaboration system 102.

Collaboration System Operations

Figure 9:
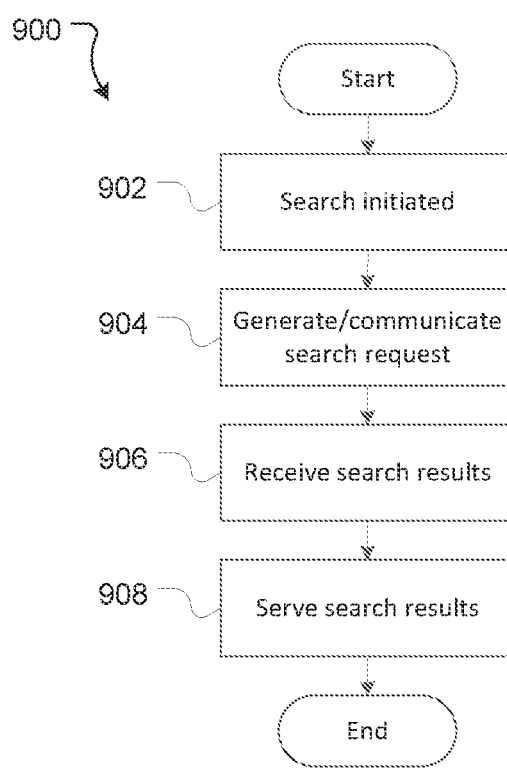
FIG. 9 is a flowchart showing operations performed by a collaboration system when a search for designated content items is performed through the collaboration system.

Operations performed by the collaboration system 102 (and associated client application 116) to search for designated content will be described with reference to process 900 of FIG. 9.

At 902 a search for designated content is initiated.

In certain embodiments, initiation of a designated content search is achieved by activation of a user interface search control 260 provided by the collaboration system application 116 running on a client device 112. Various search options may be available. For example, control 260 may be a dedicated search control which, when activated, initiates a search for all content of a particular designation in the current container (e.g. in the current chat room where the collaboration system 102 is an instant messaging system). In this case multiple dedicated search controls may be provided, one for each content designation (e.g. a decision content search control, an action content search control, etc.).

Alternatively, or in addition, activation of a search control such as 260 may cause the collaboration system application 116 to display a search interface on the display of the client device 112. The search interface may then allow a user to define various search parameters. By way of example, search parameters may include one or more of: designation type(s) (decision, action, other); container(s) (e.g. chat rooms) to search in; user(s) mentioned in relation to the designated content; user(s) who created/posted content items including designated content; date/time limitations (e.g. designated content created/modified in a particular time frame); specific content (e.g. keywords) in the actual content of the content item; or other search parameters.

At 904, the collaboration system 102 generates a search request and communicates the search request to the DIMS 104. The search request includes search parameters and other relevant data (e.g. a user identifier of the user requesting the search).

At 906, the collaboration system 102 receives search results from the DIMS 104. The search results identify zero or more designated content items with designated content matching the search parameters. In certain embodiments, the search results include complete designated content records for each search result (retrieved by the DIMS 104 from its database 108). In alternative embodiments, the search results include only content item identifiers in respect of the identified records, allowing the collaboration system 102 to retrieve its own records for those content items.

At 908, the collaboration system 102 serves the search results to collaboration system application 116 for display on client device 112 (or, in the event that no search results are identified, causes the application 116 to display an appropriate message advising the user of this). Process 900 then ends.

DIMS Operation

Figure 10:
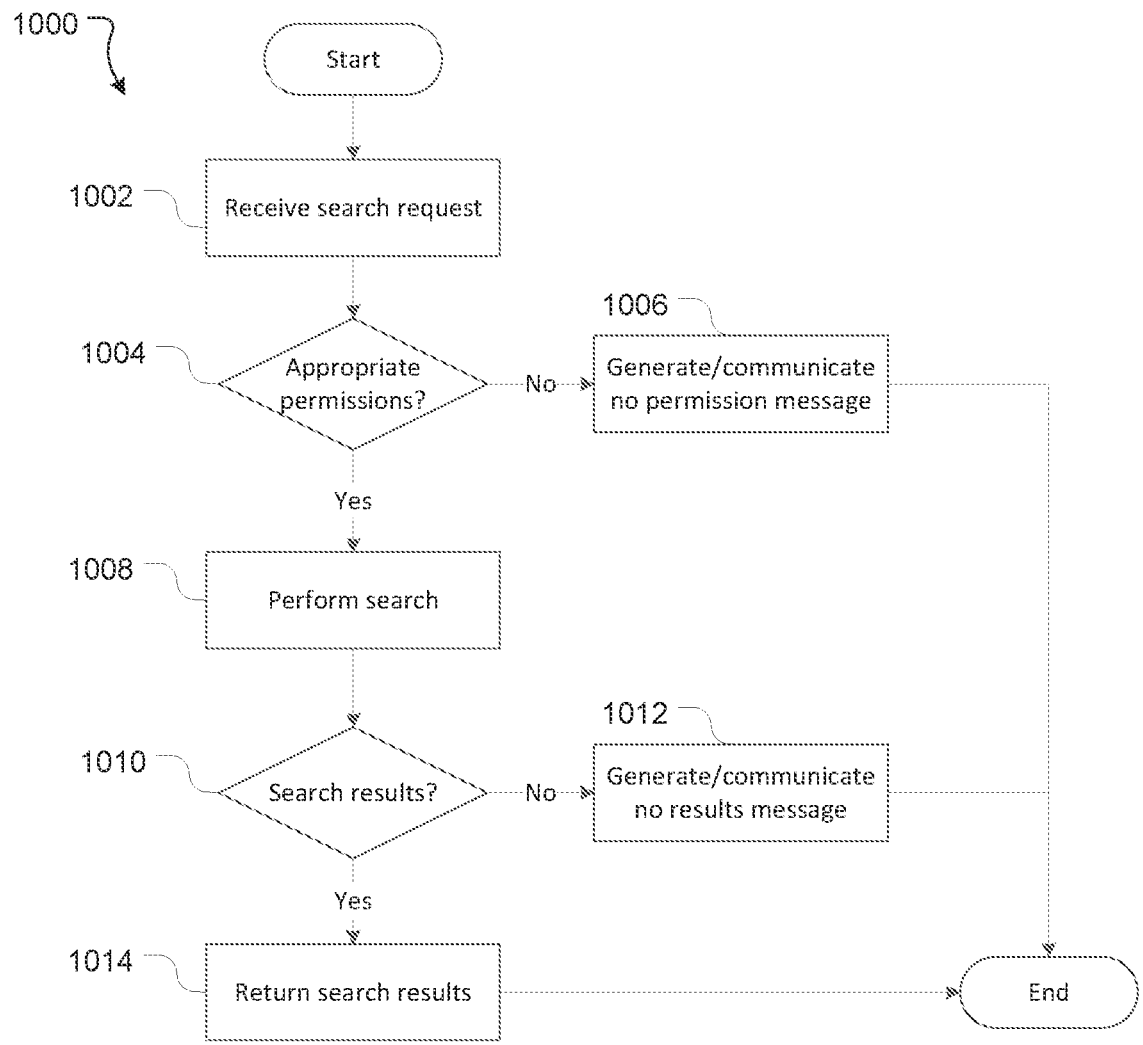
FIG. 10 is a flowchart showing operations performed by a designated item management system when a search for designated content items is performed through a collaboration system.

Operations performed by the DIMS 104 when an end user searches for designated content using the collaboration system 102 (and associated client application 116) will be described with reference to process 1000 of FIG. 10.

At 1002, the DIMS 104 (e.g. client server 107) receives search request from the collaboration system 102. As described above, in certain embodiments the search request includes a user identifier in respect of the user requesting the search and parameters defining the search (e.g. the type(s) of designated content, container(s), keywords, time/date ranges etc.).

At 1004, the DIMS 104 determines whether the user requesting the search has permission to run the search (or, at least, to view any search results of the search). In certain embodiments this determination is made by the DIMS 104 accessing the permissions service 110 to check whether the user requesting the search (identified, for example, from a user id included in the search request) has permission to access data defined by the search parameters. For example, if the search parameters for the search designate a particular container (e.g. chat room), the DIMS 104 accesses the permissions service 110 to ensure that the user requesting the search has permission to access the content of that container. If the user does not have access to the container the search cannot be performed (or, at least, search results cannot be returned to the user).

If, at 1004, the DIMS 104 determines that the user requesting the search does not have permission to perform the requested search the process continues to 1006. At 1006, an appropriate message (e.g. 'user does not have permission to perform search') is generated by the DIMS 104 and communicated to the collaboration system 102.

If, at 1004, the DIMS 104 determines that the user requesting the search does have permission to perform the requested search, the process continues to 1008. At 1008, the DIMS 104 performs a search on the designated content item database 108 for content items including designated content matching search parameters.

At 1010, the DIMS 104 determines if any designated content records matching the search parameters exist. If no designated content records match the search parameters exist, at 1012 an appropriate error message is generated and communicated to the collaboration system 102.

If, at 1010, the DIMS determines that one or more designated content records do match the search parameters the process continues to 1014. At 1014, the DIMS 102 extracts some or all of the data from the designated content records matching the search and returns the designated content records (or certain data therefrom) to the collaboration system 102 as search results. In certain embodiments the entire designated content record for each search result is communicated to the collaboration system 102. In other embodiments only a content item identifier of each search result is communicated to the collaboration system 102 (the identifier useable by the collaboration system 102 to retrieve the relevant content record from its own database).

Once the search results have been communicated to the collaboration system process 1000 ends.

Searching for Designated Content Via the DIMS

Figure 11:
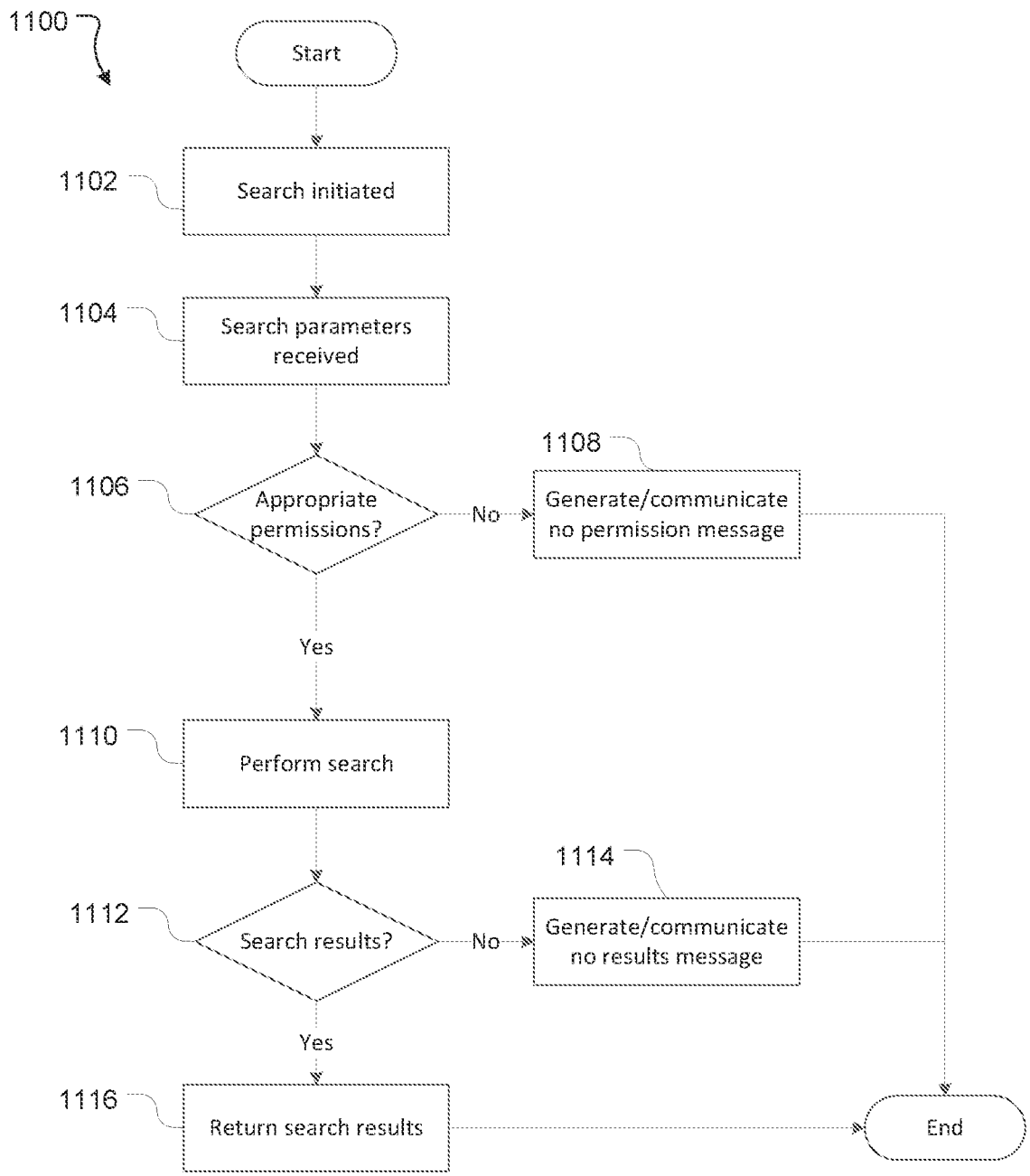
FIG. 11 is a flowchart showing operations performed by a designated item management system when a search for designated content items is performed through the designated item management system.

In certain embodiments the DIMS 104 is configured to facilitate searching for designated content directly via its associated client application 116. This will be described with reference to FIG. 11.

Searching performed directly using the DIMS 104 (via its client application 118) is similar to searching using a particular collaboration system 102 (via its client application 116) as described above. An important difference, however, is that a given collaboration system 102 will typically only have access to (and enable searching of) content items created using that collaboration system 102. In contrast, DIMS 104 can receive information in respect of content items from multiple different collaboration systems 102 (potentially operated by different entities) and, therefore, can provide searching functionality for designated content items across those multiple different collaboration systems 102.

At 1102, a search for designated content is initiated by a user. Search initiation may, for example, be by activation of a user interface search control provided by the DIMS client application 118.

At 1104, search parameters in respect of the search are received by the DIMS 104. Once again, the DIMS client application 118 provides (via client device 112) user interface controls allowing search terms to be defined. By way of example, search parameters define by a user may include one or more of: designation type(s) (decision, action, other); collaboration tool(s) (e.g. an issue tracking system, an instant messaging system, a wiki, other); container(s) maintained by collaboration system(s) (e.g. chat rooms maintained by an instant messaging system, projects maintained by an issue tracking system, web pages maintained by a wiki); user(s) mentioned in relation to a designated content item; user(s) who created/posted content items including designated content; date/time limitations (e.g. designated content items created/modified in a particular time frame); specific content (e.g. keywords) in the actual content of the content item; or other search parameters.

At 1106, the DIMS 104 determines whether the user requesting the search has permission to run the search (or, at least, to view any search results of the search). In certain embodiments this determination is made by the DIMS 104 accessing the permissions service 110 to check whether the user requesting the search (identified, for example, by a user id) has permission to access data defined by the search parameters. For example, if the search parameters designate a particular container of a particular collaboration system, the DIMS 104 accesses the permissions service 110 to ensure that the user requesting the search has permission to access the content of that container. If the user does not have access to the container the search cannot be performed (or, at least, search results cannot be returned to the user).

If, at 1106, the DIMS 104 determines that the user requesting the search does not have permission to perform the requested search the process continues to 1108. At 1108, an appropriate error message (e.g. 'user does not have permission to perform search') is returned to the user via the DIMS client application 118.

If, at 1106, the DIMS 104 determines that the user requesting the search does have permission to perform the requested search, the process continues to 1110. At 1110, the DIMS 104 performs a search on the designated content item database 108 for designated content items matching search parameters.

At 1112, the DIMS 104 determines if any designated content records matching the search parameters exist. If no designated content records matching the search parameters exist, at 1114 an appropriate error message is generated and communicated to user via the client application 118.

If, at 1112, the DIMS 104 determines that one or more designated content records do match the search parameters the process continues to 1116. At 1116, the DIMS 102 extracts the designated content records matching the search and passes these records (or certain data in respect thereof) to the DIMS client application 118 for display to the user on the client device 112.

Automated Searches for Designated Content

In certain embodiments, a collaboration tool 102 and/or the DIMS 104 may be configured to automatically perform certain searches and return any search results to a user (e.g. via the collaboration tool client application 116 or the DIMS client application 118).

For example, in certain embodiments a collaboration system client application 116 is configured to run a designated content search every time the client application 116 is started. The parameters of the search may, for example, be for all designated content of a particular type (e.g. all decision content) that have been posted in any container (e.g. chat room) the user is a member of since last time the application was launched/the user was logged in. When the collaboration system client application 116 is lunched this search provides a user with a very useful summary of important content posted while the user was inactive/offline.

In a similar fashion, the DIMS client application 118 may be configured to run a default search every time application 118 is started. In this case the difference is that instead of searching only for designated content of a particular type in one collaboration system 102, the search can be across multiple collaboration systems 102 (as described above). A search such as this provides a useful dashboard/summary of relevant content items across all collaboration tools used by the user.

ALTERNATIVE EMBODIMENTS

In the embodiments described above the collaboration systems 102 notify the DIMS 104 when new content items with designated content are created (e.g. at 308) or when edits are made to content items that impact designations (e.g. at 510). Furthermore, notifications in respect of designated content items are described as, essentially, being in real time—e.g. when a new designated content item is created at a collaboration system 102 the collaboration system 102 notifies the DIMS 104 of this. Alternative approaches are possible.

In alternative embodiments, instead of a collaboration system 102 notifying the DIMS 104 of new/edited designated content items in real time it is configured to batch together such notifications and send them in batch form to the DIMS 104 at periodic intervals.

In further alternative embodiments, the DIMS 104 may be configured to periodically request information in respect of new designated content items (and existing content items that have edits impacting designation) from a collaboration system 102. The collaboration system 102 is configured to respond to such requests by identifying and returning information in respect of all new designated content items that have been created and all existing content items with edits impacting designation since a determined time (e.g. since the last request was received from the DIMS 104).

In a further alternative embodiment, instead of communicating new/edited designated content items directly to the DIMS 104, collaboration systems 102 are configured to publish information on new/edited designated content items to a publication service (either in real time or batch mode). The DIMS 104 in turn is configured to subscribe to the publication service in order to be notified of and access/retrieve posted content items therefrom.

In still further alternative embodiments, instead of only communicating information in respect of newly created/edited designated content items the collaboration system 102 is configured to communicate information in respect of all new and edited content items. This may apply whether communication of the content items is in real time or batch mode, and whether content item information is actively pushed by the collaboration system 102 (either directly to the DIMS 104 or to a publication service) or is pulled/requested by the DIMS 104. In these embodiments, when receiving information in respect of a new or edited content item the DIMS 104 performs a check to determine whether the new/edited content item is or impacts a designated content item. If so the DIMS 104 processes the content item and if not the content item is discarded.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations.

Hardware Overview

In certain embodiments, the techniques and methods described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement the techniques.

Figure 12:
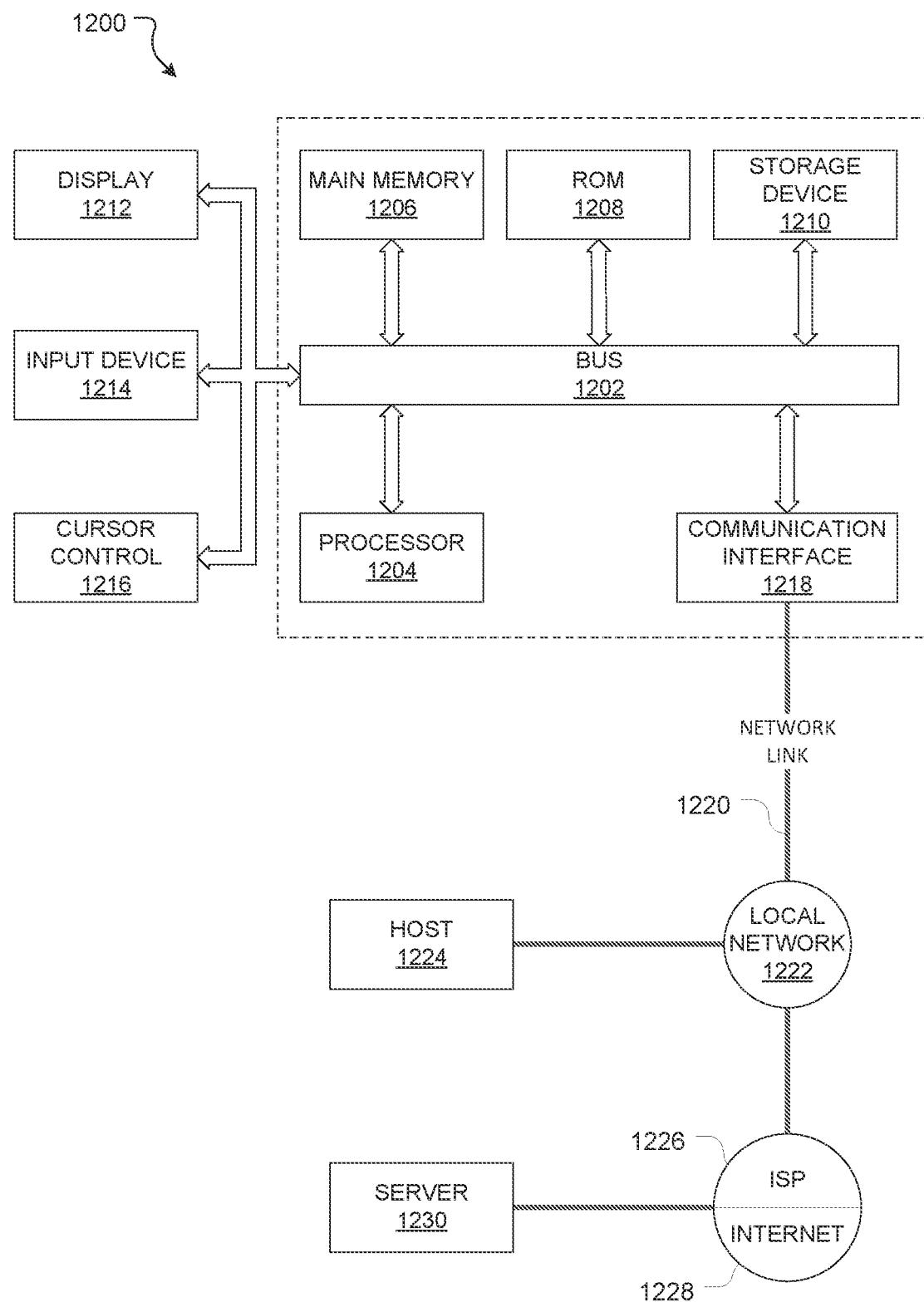
FIG. 12 is a block diagram of an exemplary computing system with which various embodiments of the present disclosure may be used.

For example, FIG. 12 is a block diagram that illustrates a computer system 1200 upon which an embodiment of the invention may be implemented. Computer system 1200 includes a bus 1202 or other communication mechanism for communicating information, and a hardware processor 104 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 102 to one more output devices such as a display 1212 for displaying information to a computer user. Display 1212 may, for example, be a cathode ray tube (CRT), a liquid crystal display (LCD), a light emitting diode (LED display), or a touch screen display. An input device 1214, including alphanumeric and other keys, may be coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that permits the device to specify positions in a plane. Additional and/or alternative input devices are possible, for example touch screen displays.

Computer system 1200 may implement the techniques described herein using customized hardwired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 106 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data 5 communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network such as network 111. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 111 to a client computer 1224 or to data equipment operated by an Internet Service Provider (ISP) 1226. ISP 1226 in turn provides data communication services through the world wide packet data communication network now commonly referred to as the "Internet" 114. Local network 111 and Internet 114 both use electrical, electromagnetic or optical signals that carry digital data streams. The signals through the various networks and the signals on network link 1220 and through communication interface 1216, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 114, ISP 1226, local network 111 and communication interface 1218.

The received code may be executed by processor 1204 as it is received, and/or stored in storage device 1210, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example, collaboration system 102 and DIMS 104 may be made up of one or more computing devices—typically desktop or server computer devices. Client device 112 may also be a computing device, for example a desktop computer, a laptop computer, a notebook computer, a tablet computer, a smart phone, or other computer.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for managing designated content items, the method comprising:

obtaining a set of messages from a first collaboration platform, the set of messages including messages from multiple participants and displayed in a first graphical interface of the first collaboration platform, each participant interfacing with the first collaboration platform using a client application operating on a respective client device;

receiving, via the first collaboration platform, a first designation for a first message of the set of messages, the first designation associated with a first decision or a first action;

in response to receiving the first designation, associating the first message with a first message identifier and associating the first message identifier with a designation topic;

receiving, via the first collaboration platform, a second designation for a second message of the set of messages, the second designation associated with a second decision or a second action;

in response to receiving the second designation, associating the second message with a second message identifier and associating the second message identifier with the designation topic; and in response to receiving, from a second graphical interface of a second collaboration platform different from the first collaboration platform, a search request comprising search parameters including one or more keywords:

using the search parameters of the search request, identifying the designation topic;

using the designation topic to identify a set of message identifiers associated with the designation topic, the set of message identifiers including the first message identifier and the second message identifier;

communicating a first external programming interface call to the first collaboration platform to retrieve the first message using the first message identifier;

communicating a second external programming interface call to the first collaboration platform to retrieve the second message using the second message identifier; and causing display of the retrieved first message along with a first graphical element that corresponds to the first designation and the retrieved second message along with a second graphical element that corresponds to the second designation in the second graphical interface of the second collaboration platform on the client device.

2. The computer-implemented method of claim 1, wherein:
the first designation corresponds to the first action; and
receiving the first designation further comprises receiving at least one of a due date for the first action or a participant assigned to the first action.

3. The computer-implemented method of claim 1, wherein:
the first designation comprises an action designation; and
in response to receiving the action designation, the second collaboration platform changes the display of the retrieved first message to indicate the action designation.

4. The computer-implemented method of claim 3, wherein:
the second designation comprises a decision designation; and
in response to receiving the decision designation, the second collaboration platform changes display of the second message to indicate the decision designation, the display of the second message being different from the display of the retrieved first message.

5. The computer-implemented method of claim 2, wherein the first designation is received from the participant that posted the first message to the first collaboration platform.

6. The computer-implemented method of claim 2, wherein the first designation is received from a participant that did not post the first message to the first collaboration platform.

7. The computer-implemented method of claim 1, wherein the first designation is different from the second designation.

8. The computer-implemented method of claim 1, wherein in response to the search parameters specifying the designation topic, the second collaboration platform retrieves a designated item management system record from a designated item management system.

9. The computer-implemented method of claim 8, wherein the designated item management system record comprises the first message and the first designation.

10. A computer-implemented method for managing designated content items, the method comprising:
obtaining a set of comments from a first collaboration platform, the set of comments including comments from multiple participants and displayed in a first graphical interface of the first collaboration platform, each participant interfacing with the first collaboration platform using a client application operating on a respective client device;
receiving, via the first collaboration platform, a first designation for a first comment of the set of comments, the first designation associated with a first decision or a first action;
in response to receiving the first designation, associating the first comment with a first comment identifier and associating the first comment identifier with a designation topic;
receiving, via the first collaboration platform, a second designation for a second comment of the set of comments, the second designation associated with a second decision or a second action;
in response to receiving the second designation, associating the second comment with a second comment identifier and associating the second comment identifier with the designation topic; and
in response to receiving, via a second graphical interface of a second collaboration platform different from the first collaboration platform, a search request comprising search parameters including one or more keywords:
using the search parameters of the search request, identifying the designation topic;
using the designation topic to identify a set of comment identifiers associated with the designation topic, the set of comment identifiers including the first comment identifier and the second comment identifier;
communicating a first external programming interface call to the first collaboration platform to retrieve at least a portion of the first comment using the first comment identifier;
communicating a second external programming interface call to the first collaboration platform to retrieve at least a portion of the second comment using the second comment identifier; and
causing display of the retrieved portion of the first comment along with a first graphical element that corresponds to the first designation and the retrieved portion of the second comment along with a second graphical element that corresponds to the second designation in the second graphical interface of the second collaboration platform on the client device.

11. The computer-implemented method of claim 10, wherein:
the first designation corresponds to the first action; and
receiving the first designation further comprises receiving at least one of a due date for the first action or a participant assigned to the first action.

12. The computer-implemented method of claim 10, wherein:
the first designation comprises an action designation; and
in response to receiving the action designation, the first collaboration platform changes display of the first comment to indicate the action designation.

13. The computer-implemented method of claim 12, wherein:
the second designation comprises a decision designation; and
in response to receiving the decision designation, the first collaboration platform changes display of the second comment to indicate the decision designation, the display of the second comment being different from the display of the first comment.

14. The computer-implemented method of claim 10, wherein:
retrieving the first comment comprises retrieving a designated item management system record associated with the first designation.

15. The computer-implemented method of claim 10, further comprising:
receiving an update to the first comment after generating a designated item management system record; and
in response to receiving the update to the first comment, updating the designated item management system record to reflect the update to content of the first comment.

16. A computer-implemented method for managing designated content items, the method comprising:

receiving, at a designated item management system, a plurality of digital content item records, each of the plurality of digital content item records corresponding to a portion of a digital content item generated at a first collaboration service and displayed in a first graphical interface of the first collaboration service on a client device;

identifying a first digital content item record of the plurality of digital content item records comprising a first designated content type and a second digital content item record of the plurality of digital content item records comprising a second designated content type;

in response to identifying the first and second designated content types:

generating a first designated item management system record corresponding to the first digital content item record of the plurality of digital content item records, the first digital content item record associated with a first record identifier and the first record identifier associated with a designation topic and comprising a first designation type; and generating a second designated item management system record corresponding to the second digital content item record of the plurality of digital content item records, the second digital content item record associated with a second record identifier and the second record identifier associated with the designation topic;

storing the first and the second designated item management system records along with the respective one of the first and the second record identifiers in a designated content item database;

in response to receiving, via a second graphical user interface of a second collaboration service different from the first collaboration service, a search request comprising search parameters including one or more keywords, identifying the designation topic using the search parameters of the search request, identifying at least the first and the second record identifiers using the designation topic, and executing a first external programming interface call and a second external programming interface call, respectively, to retrieve from the designated content item database, the first and the second designated item management system records using the first and the second record identifiers respectively;

causing display of the first and the second designated item management system records along with a respective graphical element corresponding to the respective designation type in the second graphical interface of the second collaboration service on the client device.

17. The computer-implemented method of claim 16, wherein the designated content type is assigned by a first user in response to posting a first portion of the digital content item.

18. The computer-implemented method of claim 17, wherein the designated content type is assigned by a second user, different from the first user, in response to posting a second portion of the digital content item to the first collaboration service.

19. The computer-implemented method of claim 16, wherein the designation type comprises one of an action, a task, or a decision.

20. The computer-implemented method of claim 16, wherein causing the display of the first and the second designated item management system records on the client device comprises causing the display of a first portion and a second portion of the digital content item respectively.

* * * * *